US005616276A

United States Patent [19]
Bivens et al.

[11] Patent Number: 5,616,276
[45] Date of Patent: Apr. 1, 1997

[54] AZEOTROPE-LIKE REFRIGERANTS WITH CHLORODIFLUOROMETHANE, PENTAFLUOROETHANE, AND $C_2$-$C_4$ HYDROCARBON

[75] Inventors: Donald B. Bivens, Kennett Square, Pa.; Mark B. Shiflett, Newark; Akimichi Yokozeki, Wilmington, both of Del.

[73] Assignee: E. I. Du Pont de Nemours and Company, Wilmington, Del.

[21] Appl. No.: 484,419

[22] Filed: Jun. 7, 1995

Related U.S. Application Data

[63] Continuation of Ser. No. 293,784, Aug. 22, 1994, abandoned, which is a continuation of Ser. No. 893,065, Jun. 3, 1992, abandoned, which is a division of Ser. No. 681,565, Apr. 5, 1991, abandoned, which is a continuation-in-part of Ser. No. 558,346, Jul. 26, 1990, abandoned.

[51] Int. Cl.[6] .............................. C09K 5/04; C11D 7/30
[52] U.S. Cl. ........................... 252/67; 62/114; 510/410
[58] Field of Search ..................... 252/67, 69, 162, 252/170, 171, 172, 364, DIG. 9; 62/114, 324.1; 510/410, 408, 412

[56] References Cited

U.S. PATENT DOCUMENTS

| | | | |
|---|---|---|---|
| 2,511,993 | 6/1950 | Reed | 62/178 |
| 3,581,466 | 6/1971 | Rudolph et al. | 55/56 |
| 3,960,792 | 6/1976 | Nakamura | 264/53 |
| 4,157,976 | 6/1979 | Ostrozynski et al. | 252/67 |
| 4,482,465 | 11/1984 | Gray | 252/67 |
| 4,483,154 | 11/1984 | Smeal | 62/305 |
| 4,622,825 | 11/1986 | Larue | 62/102 |
| 4,810,403 | 3/1989 | Bivens et al. | 252/67 |
| 4,943,388 | 7/1990 | Shankland et al. | 252/69 |
| 4,944,890 | 7/1990 | Deeb et al. | 252/54 |
| 4,983,312 | 1/1991 | Tamura et al. | 252/67 |
| 5,049,296 | 9/1991 | Gu | 252/67 |
| 5,108,637 | 4/1992 | Pearson | 252/67 |
| 5,151,207 | 9/1992 | Goble | 252/67 |
| 5,399,279 | 3/1995 | Sabahi et al. | 252/68 |
| 5,417,871 | 5/1995 | Minor et al. | 252/67 |

FOREIGN PATENT DOCUMENTS

| | | |
|---|---|---|
| 492777 | 7/1992 | European Pat. Off. . |
| 105088 | 5/1988 | Japan . |
| 139678 | 6/1989 | Japan . |
| 240186 | 9/1990 | Japan . |
| 4018485 | 1/1992 | Japan . |
| 92/01762 | 2/1992 | WIPO . |
| 93/07231 | 4/1993 | WIPO . |

OTHER PUBLICATIONS

Shiflett et al "Alternative Low Temperature Refrigerants" *XVIIIth International Congress of Refrigeration* Montreal Aug. 1991.

Lee, Ming–Jer et al., "Thermodynamic Property Predictions for Refrigerant Mixtures", Ind. Eng. Chem. Res., 31(4), 1212–1216. (Month unknown.) 1992.

*Primary Examiner*—Douglas J. McGinty

[57] ABSTRACT

Near-Azeotropic blends of:

pentafluoroethane and 1,1,1-trifluoroethane with one or more of chlorodifluoromethane, 1,2,2,2-tetrafluoroethane, 1,1,2,2-tetrafluoroethane, 1-chloro-1,1,2,2-tetrafluoroethane, 1-chloro-1,2,2,2-tetrafluoroethane, 1,1,1,2,3,3,3-heptafluoropropane, 1,1,1,2,2,3,3-heptafluoropropane, and perfluorocyclopropane;

chlorodifluoromethane and pentafluoroethane with one or more of ethane, butane, isobutane, dimethyl ether, propylene, and difluoromethane;

chlorodifluoromethane with 1,1,1-trifluoroethane and 1,2,2,2-tetrafluoroethane, propane and pentafluoroethane, or 1,1,1-trifluoroethane and octafluoropropane;

and pentafluoroethane with fluoroethane and 1,2,2,2-tetrafluoroethane, along with their use as refrigerants.

9 Claims, No Drawings

AZEOTROPE-LIKE REFRIGERANTS WITH CHLORODIFLUOROMETHANE, PENTAFLUOROETHANE, AND $C_2$-$C_4$ HYDROCARBON

REFERENCE TO RELATED APPLICATION

This application is a continuation of application Ser. No. 08/293,784 filed Aug. 22, 1994, now abandoned, which is a continuation of application Ser. No. 07/893,065 filed Jun. 3, 1992, now abandoned, which is a division of application Ser. No. 07/681,565 filed Apr. 5, 1991, now abandoned, which is a continuation-in-part of application Ser. No. 07/558,346 filed Jul. 26, 1990, now abandoned.

BACKGROUND OF THE INVENTION

The present invention relates to ternary and higher blends of fluorinated hydrocarbons and more specifically to near-azeotrope constant-boiling blends and expands upon refrigerant compositions for cooling and heating applications, as heretofore described in U.S. Pat. No. 4,810,403. Such blends are useful as refrigerants, heat transfer media, gaseous dielectrics, expansion agents, aerosol propellants and power cycle working fluids. Concern over the ozone depletion potential of certain halocarbons has resulted in a search for alternative compounds having lower ozone depletion potentials. A present day commercial binary azeotrope refrigerant widely used in supermarket refrigerators consists of 48.8.wt % chlorodifluoromethane (HCFC-22) and 51.2 wt % chloropentafluoroethane (CFC-115) and is generally referred to as Refrigerant-502. Due to the presence of chlorine in CFC-115, CClF2CF3, is expected to be subject to reduced usage because of its high ozone depletion potential. Additionally chlorine containing medium to low temperature refrigerants which may be subject to reduced usage could be replaced with all HFC containing blends described within.

In refrigeration applications, refrigerant is often lost through leaks during operation, such as through shaft seals, hose connections, solder joints, and broken lines. In addition, refrigerant may be released to the atmosphere during maintenance procedures performed on refrigeration equipment.

Most commercial refrigerants which are now used are pure fluids or azeotropes, many of these refrigerants have ozone depletion potentials when released to the atmosphere. Some nonazeotropic blends of refrigerants may also be used but they have the disadvantage of changing composition when a portion of the refrigerant charge is leaked or discharged to the atmosphere. Should these blends contain a flammable component, they could also become flammable due to the change of composition which occurs during the leakage of vapor from refrigeration equipment. Refrigeration equipment operation could also be adversely affected due to this change in composition and vapor pressure which results from fractionation.

What is needed, therefore, are substitute refrigerants which maintain important refrigerant properties of vapor pressure and nonflammability over a wide range of compositions, while also having reduced ozone depletion potential.

SUMMARY OF THE INVENTION

According to the present invention, near-azeotrope constant-boiling blends have been discovered comprising effective amounts of pentafluoroethane (HFC-125) and 1,1,1-trifluoroethane (HFC-143a) with one or more of the compounds set forth in Table I:

TABLE I

| Chemical Name | Generally Accepted Nomenclature |
|---|---|
| chlorodifluoromethane | HCFC-22 |
| 1,2,2,2-tetrafluoroethane | HFC-134a |
| 1,1,2,2-tetrafluoroethane | HFC-134 |
| 1-chloro-1,1,2,2-tetrafluoroethane | HFC-124a |
| 1-chloro-1,2,2,2-tetrafluoroethane | HFC-124 |
| 1,1,1,2,3,3,3-heptafluoropropane | HFC-227ea |
| 1,1,1,2,2,3,3-heptafluoropropane | HFC-227ca |
| perfluorocyclopropane | FC-C216 |

The near-azeotrope constant-boiling compositions are blends of HFC-125 and HFC-143a with any one of HCFC-22, HFC-134a, HFC-134, HFC-124a, HFC-124, HFC-227ea, HFC-227ca, and FC-C216 or mixtures thereof as set forth below. The compositions are chosen such that the blends have vapor pressures substantially equal to the vapor pressure of Refrigerant-502 and other medium to low temperature refrigerants, over a temperature range as encountered in their use as refrigerants such as −50° to 100° degrees Celcius. The compositions have ozone depletion potentials (ODP) and global warming potentials (GWP) of 0 to 0.02 and 0.5 to 1.0 respectively which are substantially lower than the Refrigerant-502 value of 0.25 ODP and 5.1 GWP.

Additional, near-azeotrope constant-boiling blends have been discovered comprising effective amounts of chlorodifluoromethane (HCFC-22) and/or pentafluoroethane (HFC-125) with one or more of the compounds set forth in Tables I and II:

TABLE II

| Chemical Name | Generally Accepted Nomenclature |
|---|---|
| propane | HC-290 |
| octafluoropropane | FC-218 |
| fluoroethane | HFC-161 |

The near-azeotrope constant-boiling compositions are blends of HCFC-22 with propane and HFC-125, HCFC-22 with HFC-143a and HFC-134a, or HCFC-22 with HFC-143a and FC-218. Also, a near-azeotrope constant-boiling composition is a blend of HFC-125 with HFC-161 and HFC-134a. The compositions are chosen such that the blends have vapor pressures substantially equal to the vapor pressure of Refrigerant-502 and other medium to low temperature refrigerants, over a temperature range as encountered in their use as refrigerants such as −50° to 100° degrees Celcius. The compositions have ozone depletion potentials (ODP) lower than Refrigerant-502, however, blends formulated with octafluoropropane may have global warming potentials lower, or equal to Refrigerant-502 depending on the composition of octafluoropropane.

The near-azeotropic blends may also be used to produce heat by condensing the composition in the vicinity of the body to be heated and thereafter evaporating the condensate.

The use of near-azeotropic blends minimizes the problem of component fractionation and handling in system operations.

Finally, the near-azeotropic blends can be formulated to offer the same advantage as Refrigerant-502 and other medium to low temperature refrigerants as being nonflammable at room temperature and atmospheric pressure.

DETAILED DESCRIPTION OF THE INVENTION

By refrigeration is meant the utilization of physical change in a substance to produce a cooling or heating effect. The physical change can be, for example, a change from the solid state to the liquid state or a change from the liquid state to the vapor state or the reverse order.

By refrigerant is meant the substance which undergoes physical change in refrigeration.

By ozone depletion potential is meant the ratio of the calculated ozone depletion in the stratosphere resulting from the emission of a compound compared to the ozone depletion potential resulting from the same rate of emission of CFC-11 which is set at 1.0. A method of calculating ozone depletion potential is described in "The Relative Efficiency of a Number of Halocarbons for Destroying Stratospheric Ozone", by D. J. Wuebbles, Lawrence Livermore Laboratory report UCID-18924, January, 1981, and "Chlorocarbon Emission Scenarios: Potential Impact on Stratospheric Ozone" by D. J. Wuebbles, Journal Geophysics Research, 88, 1433–1443, 1983.

By nonflammable is meant a gas mixture in air which will not burn when subjected to a spark igniter as described in "Limits of Flammability of Gases and Vapours", Bulletin 503, H. F. Coward et al , Washington, U.S. Bureau of Mines, 1952.

By "vapor pressures substantially equal to the vapor pressure of Refrigerant-502 and other medium to low temperature refrigerants" is meant a vapor pressure which is plus or minus twenty-five percent of the vapor pressure of Refrigerant-502 and other medium to low temperature refrigerants at the same temperature within the range of –50° to 100° degrees Celsius.

By substantially lower ozone depletion potential than the ozone depletion of Refrigerant-502 is meant an ozone depletion potential at least fifty percent less than the ozone depletion potential of Refrigerant-502, i.e. less than 0.125.

By substantially lower global warming potential than the global warming potential of Refrigerant-502 is meant a global warming potential at least fifty percent less than the global warming potential of Refrigerant-502, i.e., less than 2.55.

As mentioned above, when a refrigerant blend contains a flammable component, the possibility of either the discharged vapor or the remaining refrigerant upon leakage becoming flammable constitutes a highly undesirable safety hazard. The present compositions can be so formulated that the lowest boiling and highest boiling components are nonflammable so that even when the intermediate boiling component is flammable, not only is the original composition nonflammable, but additionally, neither the leaking vapor nor the remaining refrigerant becomes flammable.

The present invention provides near-azeotropic blends which have vapor pressures near that of Refrigerant-502 and other medium to low temperature refrigerants and surprisingly even after an 80 percent evaporation loss by weight. A vapor pressure/temperature relation similar to that of Refrigerant-502 and other medium to low temperature refrigerants is particularly desirable since much existing refrigeration equipment which has been designed to use Refrigerant-502 and other medium to low temperature refrigerants can also use the refrigerants of the present invention with little or no modification.

The preferred halocarbon components in the blends are listed in the Table III:

TABLE III

| Refrigerant | Chemical Formula | Boiling Pt (°C.) | DP | GWP |
|---|---|---|---|---|
| R-502 | $CHClF_2CClF_2CF_3$ | –50.0 | .25 | 5.1 |
| HFC-125 | $CHF_2CF_3$ | –48.5 | .0 | .65 |
| HFC-143a | $CF_3CH_3$ | –47.6 | .0 | .76 |
| HCFC-22 | $CHClF_2$ | –40.8 | .05 | .37 |
| HFC-134a | $CF_3CH_2F$ | –26.5 | .0 | .29 |
| HFC-134 | $CHF_2CHF_2$ | –19.7 | .0 | .30 |
| HFC-124a | $CHF_2CClF_2$ | –10.2 | .02 | .10 |
| HFC-124 | $CHClFCF_3$ | –12.0 | .02 | .10 |
| HFC-227ea | $CF_3CHFCF_3$ | –18.0 | .0 | * |
| HFC-227ca | $CF_3CF_2CHF_2$ | –17.0 | .0 | * |
| HFC-161 | $CH_3CFH_2$ | –37.1 | .0 | * |
| FC-C216 | $CF_2CF_2CF_2$ (cyclic) | –31.5 | .0 | * |
| FC-218 | $CF_3CF_2CF_3$ | –36.5 | .0 | * |
| HC-290 | $CH_3CH_2CH_3$ | –42.1 | .0 | * |

The blends of the instant invention comprise HCFC-22 and/or HFC-125 with one or more of the others from Table III.

The near-azeotropic blends of the instant invention can be prepared by any convenient method including mixing or combining the desired component amounts. A preferred method is to weigh the desired component amounts and thereafter combine them in an appropriate container.

The near-azeotropic blends of the present invention have the following compositions:

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent HFC-134a.

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent HFC-134.

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent HFC-124a.

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent HFC-124.

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent HFC-227ea.

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent HFC-227ca.

35 to 65, preferably 50 to 60, and most preferably 55.0 weight percent HFC-125; 30 to 60, preferably 35 to 45, and most preferably 40.0 weight percent HFC-143a; and 3 to 15, preferably 3 to 10, and most preferably 5.0 weight percent FC-C216.

5 to 30, preferably 15 to 25, and most preferably 20.0 weight percent HFC-125; 30 to 60, preferably 30 to 40, and most preferably 35.0 weight percent HFC-143a; and 30 to 55, preferably 40 to 50, and most preferably 45.0 weight percent HCFC-22.

30 to 55, preferably 40 to 50, and most preferably 45.0 weight percent HCFC-22; 30 to 60, preferably 45 to 55, and most preferably 50.0 weight percent HFC-143a; and 3 to 15, preferably 3 to 10, and most preferably 5.0 weight percent HFC-134a.

1 to 98.9, preferably 30 to 85, and most preferably 45 to 65 weight percent HCFC-22; 0.1 to 15, preferably 1 to 10, and most preferably 2 to 5 weight percent propane; and 1 to 98.9, preferably 14 to 69, and most preferably 33 to 53 weight percent HFC-125.

60 to 90, preferably 75 to 85, and most preferably 80.0 weight percent HFC-125; 5 to 20, preferably 10 to 15, and most preferably 15.0 weight percent HFC-161; and 3 to 15, preferably 3 to 10, and most preferably 5.0 weight percent HFC-134a.

30 to 50, preferably 35 to 45, and most preferably 37.0 weight percent HCFC-22; 20 to 60, preferably 25 to 40, and most preferably 28.0 weight percent HFC-143a; and 10 to 45, preferably 30 to 40, and most preferably 35.0 weight percent FC-218.

There are other ternary and higher blends having these desirable characteristics that could be formulated by those skilled in the art from the halocarbons defined and exemplified herein. For example, other blends that may be formulated for the purposes of this invention are:

TABLE IV

| | Liquid Weight Percentage | | |
|---|---|---|---|
| Blend Components | Acceptable | Preferred | Most Preferred |
| HFC-125/HFC-143a/ HFC-134/HFC-134a | 35–65/30–60/ 3–15/3–15 | 45–55/35–45/ 3–10/3–10 | 50/40/5/5 |
| HFC-125/HFC-143a/ HFC-134a/HCFC-22 | 35–65/30–60/ 3–15/30–55 | 35–50/30–40/ 3–10/15–25 | 40/35/5/20 |
| HFC-125/HFC-143a/ HFC-134a/HFC-124a | 35–65/30–60 3–20/3–15 | 45–55/30–40/ 5–15/3–10 | 50/35/10/5 |

In addition, more than one halocarbon can be selected from each of the temperature ranges. The objective of this description is not to identify every possible blend composition, but to illustrate our discovery of the unexpected properties that the ternary (or higher) blends can take on, depending on the components, and the chosen compositions.

The refrigerant of the instant invention can be prepared by a simple mixing process as is well known to those skilled in the art.

Specific examples of the present invention will now be set forth. Unless otherwise stated, all percentages are by weight. It is to be understood that these examples are merely illustrative and are in no way to be interpreted as limiting the scope of this invention.

EXAMPLE 1

Impact of Vapor Leakage on Vapor Pressure at 24° C.

TABLE V

| | Vapor Pressures | | | | |
|---|---|---|---|---|---|
| | 0% Evaporated | | 80% Evaporated | | |
| Refrigerant/ Composition | psia | (KPa) | psia | (KPa) | % Change |
| R-502 | 171.1 | (1180) | 171.1 | (1180) | 0.0 |
| HFC-125/HFC-143a/ HFC-134a(55/40/5) | 176.2 | (1215) | 165.2 | (1139) | 6.2 |
| HFC-125/HFC-143a/ HFC-134 (55/40/5) | 176.3 | (1216) | 164.3 | (1133) | 6.8 |
| HFC-125/HFC-143a/ HFC-124a(55/40/5) | 179.0 | (1234) | 173.4 | (1196) | 3.1 |
| HFC-125/HFC-143a/ HFC-124(55/40/5) | 178.2 | (1229) | 169.1 | (1166) | 5.1 |
| HFC-125/HFC-143a/ HFC-227ea(55/40/5) | 179.1 | (1235) | 171.5 | (1182) | 4.2 |
| HFC-125/HFC-143a/ FC-C216(55/40/5) | 179.5 | (1238) | 174.8 | (1205) | 2.6 |
| HFC-125/HFC-143a/ HCFC-22(20/35/45) | 170.3 | (1174) | 160.1 | (1104) | 6.0* |
| HCFC-22/HFC-143a/ HFC-134a(45/50/5) | 160.8 | (1109) | 156.8 | (1081) | 4.0 |
| HCFC-22/Propane/ HFC-125(45/10/45) | 206.3 | (1422) | 187.4 | (1292) | 9.2 |
| HFC-125/HFC-161/ HFC-134a(80/15/5) | 194.1 | (1338) | 181.7 | (1253) | 12.4 |
| HCFC-22/HFC-143a/ FC-218(37/28/35) | 174.7 | (1205) | 160.0 | (1103) | 8.4 |

*87% evaporated

Example 1 demonstrates that all of the near-azeotropic blends of the present invention exhibit very low vapor pressure changes after 80 or more percent by weight of the charge was leaked away. This vapor pressure versus leak performance behavior closely approximates that of a Refrigerant-502 alone. The vapor pressure performance indicates that the near-azeotropic blends would maintain their vapor pressure characteristics, even if 80 weight percent of the refrigerant were to be lost.

HFC-227ca is very similar to HFC-227ea and can be substituted therefore in similar proportions.

TABLE VI

| | Refrigerant Performance | | | |
|---|---|---|---|---|
| Refrigerant Composition | Compressor Capacity Btu/min (kW)* | Exit COP Pressure psia (KPa) | Temp F(°C.) | DT F(°C.)** |
| R-302 | 80.1(1407)1.89 | 282(1944) | 239(115) | .0 (.0) |
| HFC-125 | 82.2(1462)1.69 | 327(2255) | 223(106) | .0 (.0) |
| HFC-125/ HFC-143a/ HFC-134a (55/40/5) | 82.7(1453)1.82 | 307(2117) | 227(108) | .8 (.4) |
| HFC-125/ HFC-143a/ HFC-134 (55/40/5) | 82.6(1451)1.83 | 307(2117) | 229(109) | 1.1 (.6) |
| HFC-125/ HFC-143a/ HFC-124 (55/40/5) | 80.5(1414)1.82 | 304(2096) | 229(109) | 2.0 (1.0) |
| HFC-125/ HFC-143a/ HFC-227ea | 81.4(1430)1.81 | 307(2117) | 226(108) | 1.4 (.7) |

TABLE VI-continued

| Composition | | | | |
|---|---|---|---|---|
| (55/40/5) HFC-125/ HFC-143a/ HCFC-22 (20/35/45) | 85.6(1504)1.93 | 291(2006) | 255(124) | .7 (.4) |
| HCFC-22/ HFC-143a/ HFC-134a (45/50/5) | 81.1(1425)1.96 | 277(1910) | 256(123) | .6 (.3) |
| HCFC-22/ Propane/ HFC-125 (45/10/45) | 80.1(1407)1.88 | 290(1999) | 253(123) | 1.6 (.9) |
| HFC-125/ HFC-161/ HFC-134a (80/15/5) | 74.5(1309)1.81 | 294(2027) | 239(115) | 1.5 (.8) |
| HCFC-22/ HFC-143a/ FC-218 (35/40/25) | 79.4(1395)1.90 | 282(1944) | 232(111) | .1 (.1) |

Conditions test were run under:

| | | |
|---|---|---|
| Condenser Temp | 115° F. | (46° C.) |
| Evaporator Temp | −30° F. | (−34° C.) |
| Suction superheated to Temp | 95° F. | (35° C.) |
| Heat Exchanger used in refrigeration cycle | | |
| Compressor Efficiency assumed 1.0 | | |

*based on a compressor displacement of 3.5 ft³/min (0.099 m³/min)
**represents condensing temperature differential across condenser Example 2 data suggest that the near-azeotropic blends compare quite favorably with the commercial Refrigerant-502 refrigeration performance. Also, pentafluoroethane (HFC-125), the refrigerant recognized by the refrigeration industry as a plausible substitute for Refrigerant-502 has a 10–15 percent decrease in energy efficiency. Energy efficiency is measured by coefficient of performance (COP). Therefore, the present blends of chlorodifluoromethane (HCFC-22) and/or pentafluoroethane (HFC-125) with one or more additional components exhibit a substantial improvement in energy efficiency. All the blends have better energy efficiencies than pentafluoroethane (HFC-125) alone and some better than Refrigerant-502.

HCFC-124a is very similar to HCFC-124 and can be substituted therefore in similar proportions, HFC-227ca is very similar to HFC-227ea and can be substituted therefore in similar proportions, and FC-C216 can be substituted as a third component giving similar refrigeration performance.

EXAMPLE 3—COMPARATIVE EXAMPLE

A blend was prepared consisting of liquid concentrations of 57.9% pentafluoroethane (HFC-125) and 42.1% 1,1,1-trifluoroethane (HFC-143a). The vapor pressure of the blend was 185.5 psia (1279 KPa) at 24 deg Celcius. After 84.6% of the initial blend charge was lost via a vapor leak, the liquid composition had changed to 53.2% HFC-125 and 46.8% HFC-143a. The vapor composition of HFC-143a was 39.1% initially and increased to 44.3%. The vapor pressure decreased to 172.5 psia (1189 KPa). The conclusion of this test was the HFC-143a composition would continue to increase during the remainder of the leak and this blend will become flammable; therefore, a third component is necessary when blending HFC-125 and HFC-143a to prevent the blend from becoming flammable.

EXAMPLE 4

A blend was prepared consisting of liquid concentrations of 55.8% pentafluoroethane (HFC-125), 38.4% 1,1,1-trifluoroethane (HFC-143a), and 5.8% 1,2,2,2-tetrafluoroethane (HFC-134a). The ozone depletion potential of the blend is 0 and the global warming potential was calculated to be 0.68. Compared with Refrigerant-502 the blend has no ozone depletion potential and a 87% reduction in global warming potential. The vapor pressure was within 5% of the vapor pressure of Refrigerant-502 over the temperature range of −50–100 deg Celcius. At 24 deg Celcius, the blend had a vapor pressure of 176.2 psia (1215 KPa) compared with a vapor pressure of 171.1 psia (1180 KPa) for Refrigerant-502.

To illustrate the surprisingly small changes in vapor pressure with compositional changes that occur during vapor leaks, vapor was allowed to leak from a suitable container holding the liquid blend and equilibrium vapor. After 96% of the initial blend charge had been lost via the vapor leak, the liquid compositions had changed to 45.9% HFC-125, 37.3% HFC-143a, and 16.8% HFC-134a. The vapor pressure after an 80% leak had decreased to 165.2 (1139 KPa) at 24 deg Celcius, being within 3.5% of the Refrigerant-502 vapor pressure.

To illustrate the nonflammability of the blend, liquid and vapor samples were analyzed at the beginning and end of the leak test as well as vapor samples taken at blend charge weight losses of 5 to 95% in increments of 5%. The highest HFC-143a concentration was 39.2% in the vapor at 69.6% weight loss. At this point, the total vapor content was 53.8% HFC-125, 39.2% HFC-143a, and 7.0% HFC-134a. The lower flammability limit at this point of HFC-125 and HFC-143a is above 39.2% at room temperature, therefore, with only 39.2% HFC-143a the blend is nonflammable at room temperature and atmospheric pressure.

EXAMPLE 5

Another blend was prepared consisting of liquid compositions of 53.7% pentafluoroethane (HFC-125), 41.0% 1,1,1-trifluoroethane (HFC-143a), and 5.3% 1,1,2,2-tetrafluoroethane (HFC-134). The ozone depletion potential of the blend is 0 and the global warming potential was calculated to be 0.68. Compared with Refrigerant-502 the blend has no ozone depletion potential and a 87% reduction in global warming potential. The vapor pressure of the blend was 176.3 psia (1216 KPa) at 24 deg Celcius compared with 171.1 psia (1180 KPa) for Refrigerant-502. After 97.7% of the initial blend charge was lost via a vapor leak, the liquid compositions had changed to 43.3% HFC-125, 39.0% HFC-143a, and 17.7% HFC-134. The vapor pressure after 80% leak had decreased to 164.3 psia (1133 KPa) at 24 deg Celcius, being within 6.4% of the Refrigerant-502 vapor pressure. The highest HFC-143a concentration was 42.7% in the vapor at 85% weight loss. At this point, the total vapor content was 51.0% HFC-125, 42.7% HFC-143a, and 6.3% HFC-134. Again, experimentally, the maximum nonflammable concentration of HFC-143a in HFC-125 at any air concentration is above 42.7% at room temperature; therefore, with only 42.7% HFC-143a, the blend is nonflammable at room temperature and atmospheric pressure.

EXAMPLE 6

Another blend was prepared consisting of liquid compositions of 20.7% pentafluoroethane (HFC-125), 35.7% 1,1,1-trifluoroethane (HFC-143a), and 43.6% chlorodifluoromethane (HCFC-22). The ozone depletion potential was calculated to be 0.02 and the global warming potential 0.56. A 92% and 89% reduction in ozone depletion and global warming potentials, respectively. The vapor pressure of the blend was 170.3 psia (1174 KPa) at 24 deg Celcius compared with 171.1 psia (1180 KPa) for Refrigerant-502. After 87% of the initial blend charge was lost via a vapor leak, the liquid composition had changed to 8.6% HFC-125, 30.3% HFC-143a, and 61.1% HCFC-22. The vapor pressure had decreased to 160.1 psia (1104 KPa) at 24 deg Celcius being within 6.5% of the Refrigerant-502 vapor pressure. The highest HFC-143a concentration was 36.9% in the vapor at 46.4% weight loss, again being a nonflammable blend at room temperature and atmospheric pressure.

EXAMPLE 7

A blend was prepared consisting of liquid concentrations of 37.2% chlorodifluoromethane (HCFC-22), 28.1% 1,1,1-trifluoroethane (HFC-143a), and 34.7% octafluoropropane (FC-218). The ozone depletion of the blend is 0.02 and the global warming potential is dependent on the concentration of FC-218. Compared with Refrigerant-502 the blend has lower ozone depletion potential and may be formulated to have lower or equal global warming potential to Refrigerant-502. At 24 deg Celcius, the blend had a vapor pressure of 174.7 psia (1205 KPa) compared with the vapor pressure of 171.1 psia (1180 KPa) for Refrigerant-502.

To illustrate the surprisingly small changes in vapor pressure with compositional changes that occur during vapor leaks, vapor was allowed to leak from a suitable container holding the liquid blend and equilibrium vapor. After 95.6% of the initial blend charge had been lost via the vapor leak, the liquid compositions had changed to 50.3% HCFC-22, 30.3% HFC-143a, and 19.4% FC-218. The vapor pressure after an 80% leak had decreased to 168.4 psia (1161 KPa) at 24 deg Celcius, being within 2% of the Refrigerant-502 vapor pressure. Due to the increase in HFC-143a liquid composition the vapor was allowed to continue leaking. Initial liquid compositions were again measured at 50.7% HCFC-22, 30.9% HFC-143a, and 18.4% FC-218. After 94.5% of the blend charge at the above liquid compositions had been lost after further evaporation via a vapor leak, the liquid compositions had changed to 74.0% HCFC-22, 25.4% HFC-143a, and 0.6% FC-218. Again, the vapor pressure after an 80% leak had decreased to 160.0 psia (110 3 KPa) at 24 deg Celcius, being within 6.5% of the Refrigerant-502 vapor pressure.

To illustrate the nonflammability of the blend, liquid and vapor samples were analyzed at the beginning and end of both leak tests as well as vapor samples taken at blend charge weight losses of 5 to 95% in increments of 5%. The highest HFC-143a concentration was 33.4% in the vapor at 78.8% weight loss during the continued leak test. At this point, the total vapor content was 56.4% HCFC-22, 33.4% HFC-143a, and 10.2% FC-218. Experimentally, the maximum nonflammable concentration of HFC-143a in HFC-125 at any air concentration is above 33.4% HFC-143a at room temperature, therefore, with only 33.4% HFC-143a, the blend is nonflammable at room temperature and atmospheric pressure.

EXAMPLE 8

A commercial icemaker was used to evaluate the performance of the near-azeotrope blends with Refrigerant-502. High and low side pressure were measured as well as inlet and exit temperature around the condenser, evaporator, and compressor. The energy consumption was measured and the quality and quantity of ice produced. For similar operating conditions the blends of HCFC-22/HFC-143a/HFC-125, HFC-125/HFC-143a/HFC-134a, and HFC-125/Propane/HCFC-22 performed essentially the same as Refrigrant-502.

EXAMPLE 9

A study shows that a mixture of HCFC-22, propane, and HFC-125 at the following composition is constant boiling. Allowing 50 weight percent of the mixture to leak out as vapor at room temperature the vapor pressure changes less than 10 percent. (IQ) is initial liquid composition, (FQ) is final liquid composition, (1-5) is vapor compositions, (VP) is vapor pressure, (DP) is change in vapor pressure from original mixture, and (leakage) represents the weight % leakage.

TABLE VII

| SAMPLE | LEAKAGE | COMPOSITION (Weight %) | | | VP (psia) | DP (%) |
|---|---|---|---|---|---|---|
| | | HCFC-22 | HFC-125 | Propane | | |
| IQ | 0 | 90.0 | 8.0 | 2.0 | 164.3 | — |
| 1 | 10 | 84.6 | 11.8 | 3.5 | 163.3 | 0.6 |
| 2 | 20 | 85.7 | 11.1 | 3.2 | 162.3 | 1.2 |
| 3 | 30 | 86.8 | 10.4 | 2.8 | 161.3 | 1.8 |
| 4 | 40 | 88.1 | 9.5 | 2.4 | 160.1 | 2.6 |
| 5 | 50 | 89.4 | 8.6 | 2.0 | 159.0 | 3.2 |
| FQ | 50 | 93.7 | 5.3 | 1.0 | 159.0 | 3.2 |

TABLE VIII

| SAMPLE | LEAKAGE | COMPOSITION (Weight %) | | | VP (psia) | DP (%) |
|---|---|---|---|---|---|---|
| | | HCFC-22 | HFC-125 | Propane | | |
| IQ | 0 | 70.0 | 28.0 | 2.0 | 178.8 | — |
| 1 | 10 | 60.7 | 35.9 | 3.4 | 177.5 | 0.7 |
| 2 | 20 | 62.1 | 34.8 | 3.0 | 176.2 | 1.5 |
| 3 | 30 | 63.7 | 33.6 | 2.8 | 174.8 | 2.2 |
| 4 | 40 | 65.5 | 32.1 | 2.4 | 173.1 | 3.2 |
| 5 | 50 | 67.6 | 30.3 | 2.1 | 171.4 | 4.1 |
| FQ | 50 | 77.2 | 21.8 | 1.1 | 171.4 | 4.1 |

TABLE IX

| SAMPLE | LEAKAGE | COMPOSITION (Weight %) | | | VP (psia) | DP (%) |
|---|---|---|---|---|---|---|
| | | HCFC-22 | HFC-125 | Propane | | |
| IQ | 0 | 50.0 | 48.0 | 2.0 | 191.3 | — |
| 1 | 10 | 41.9 | 54.8 | 3.3 | 190.2 | 0.6 |
| 2 | 20 | 42.9 | 54.1 | 3.0 | 189.0 | 1.2 |
| 3 | 30 | 44.0 | 53.2 | 2.7 | 187.8 | 1.8 |
| 4 | 40 | 45.4 | 52.2 | 2.4 | 186.3 | 2.6 |
| 5 | 50 | 47.1 | 50.9 | 2.1 | 184.6 | 3.5 |
| FQ | 50 | 56.6 | 42.3 | 1.1 | 184.6 | 3.5 |

TABLE X

| SAMPLE | LEAKAGE | COMPOSITION (Weight %) | | | VP (psia) | DP (%) |
|---|---|---|---|---|---|---|
| | | HCFC-22 | HFC-125 | Propane | | |
| IQ | 0 | 30.0 | 68.0 | 2.0 | 201.8 | — |
| 1 | 10 | 25.5 | 71.1 | 3.4 | 200.9 | 0.4 |
| 2 | 20 | 26.0 | 70.9 | 3.1 | 199.9 | 0.9 |
| 3 | 30 | 26.6 | 70.6 | 2.8 | 198.9 | 1.4 |
| 4 | 40 | 27.4 | 70.2 | 2.4 | 197.7 | 2.0 |
| 5 | 50 | 28.2 | 69.7 | 2.1 | 196.5 | 2.6 |
| FQ | 50 | 33.6 | 65.3 | 1.1 | 196.5 | 2.6 |

TABLE XI

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 10.0 | 88.0 | 2.0 | 209.8 | — |
| 1 | 10 | 9.1 | 87.2 | 3.7 | 208.8 | 0.5 |
| 2 | 20 | 9.3 | 87.5 | 3.3 | 207.7 | 1.0 |
| 3 | 30 | 9.4 | 87.7 | 2.9 | 206.7 | 1.5 |
| 4 | 40 | 9.6 | 88.0 | 2.4 | 205.4 | 2.1 |
| 5 | 50 | 9.8 | 88.2 | 2.0 | 204.2 | 2.7 |
| FQ | 50 | 10.6 | 88.4 | 0.9 | 204.2 | 2.7 |

TABLE XII

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 80.0 | 5.0 | 15.0 | 180.2 | — |
| 1 | 10 | 74.0 | 7.7 | 18.3 | 179.7 | 0.3 |
| 2 | 20 | 74.8 | 7.2 | 18.0 | 179.1 | 0.6 |
| 3 | 30 | 75.8 | 6.6 | 17.6 | 178.5 | 0.9 |
| 4 | 40 | 76.9 | 6.0 | 17.2 | 177.7 | 1.4 |
| 5 | 50 | 78.1 | 5.3 | 16.6 | 176.8 | 1.9 |
| FQ | 50 | 84.5 | 3.2 | 12.3 | 176.8 | 1.9 |

TABLE XIII

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 60.0 | 25.0 | 15.0 | 196.9 | — |
| 1 | 10 | 50.1 | 33.1 | 16.7 | 195.9 | 0.5 |
| 2 | 20 | 51.5 | 31.9 | 16.6 | 194.9 | 1.0 |
| 3 | 30 | 53.0 | 30.5 | 16.5 | 193.8 | 1.6 |
| 4 | 40 | 54.8 | 28.9 | 16.3 | 192.4 | 2.3 |
| 5 | 50 | 56.9 | 27.0 | 16.1 | 190.8 | 3.1 |
| FQ | 50 | 67.7 | 18.8 | 13.4 | 190.8 | 3.1 |

TABLE XIV

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 40.0 | 45.0 | 15.0 | 211.7 | — |
| 1 | 10 | 31.6 | 52.4 | 16.0 | 211.0 | 0.3 |
| 2 | 20 | 32.5 | 51.5 | 16.0 | 210.2 | 0.7 |
| 3 | 30 | 33.6 | 50.5 | 15.9 | 209.2 | 1.2 |
| 4 | 40 | 35.0 | 49.2 | 15.8 | 208.1 | 1.7 |
| 5 | 50 | 36.6 | 47.8 | 15.6 | 206.7 | 2.4 |
| FQ | 50 | 47.0 | 39.0 | 14.1 | 206.7 | 2.4 |

TABLE XV

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 20.0 | 65.0 | 15.0 | 224.9 | — |
| 1 | 10 | 15.6 | 68.4 | 16.0 | 224.6 | 0.1 |
| 2 | 20 | 16.1 | 68.0 | 15.9 | 224.2 | 0.3 |
| 3 | 30 | 16.6 | 67.6 | 15.8 | 223.7 | 0.5 |
| 4 | 40 | 17.2 | 67.1 | 15.7 | 223.1 | 0.8 |

TABLE XV-continued

| SAMPLE | LEAK-AGE | COMPOSITION (Weight %) HCFC-22 | HFC-125 | Propane | VP (psia) | DP (%) |
|---|---|---|---|---|---|---|
| 5 | 50 | 18.0 | 66.5 | 15.5 | 222.4 | 1.1 |
| FQ | 50 | 23.6 | 62.2 | 14.1 | 222.4 | 1.1 |

TABLE XVI

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 1.0 | 97.0 | 2.0 | 212.1 | — |
| 1 | 10 | 1.0 | 95.2 | 3.8 | 210.9 | 0.6 |
| 2 | 20 | 1.0 | 95.6 | 3.4 | 209.6 | 1.2 |
| 3 | 30 | 1.0 | 96.1 | 2.9 | 208.3 | 1.8 |
| 4 | 40 | 1.0 | 96.5 | 2.5 | 206.9 | 2.5 |
| 5 | 50 | 1.0 | 97.0 | 2.0 | 205.4 | 3.2 |
| FQ | 50 | 1.0 | 98.1 | 0.9 | 205.4 | 3.2 |

TABLE XVII

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 97.0 | 1.0 | 2.0 | 158.7 | — |
| 1 | 10 | 94.8 | 1.6 | 3.6 | 158.0 | 0.4 |
| 2 | 20 | 95.3 | 1.4 | 3.3 | 157.4 | 0.8 |
| 3 | 30 | 95.8 | 1.3 | 2.9 | 156.7 | 1.3 |
| 4 | 40 | 96.4 | 1.2 | 2.4 | 155.9 | 1.8 |
| 5 | 50 | 96.9 | 1.1 | 2.0 | 155.2 | 2.2 |
| FQ | 50 | 98.4 | 0.6 | 1.0 | 155.2 | 2.2 |

TABLE XVIII

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 98.9 | 1.0 | 0.1 | 152.5 | — |
| 1 | 10 | 98.2 | 1.6 | 0.2 | 152.4 | 0.1 |
| 2 | 20 | 98.4 | 1.5 | 0.1 | 152.3 | 0.1 |
| 3 | 30 | 98.5 | 1.3 | 0.1 | 152.2 | 0.2 |
| 4 | 40 | 98.7 | 1.2 | 0.1 | 152.1 | 0.3 |
| 5 | 50 | 98.9 | 1.0 | 0.1 | 152.0 | 0.3 |
| FQ | 50 | 99.3 | 0.6 | 0.1 | 152.0 | 0.3 |

TABLE XIX

| SAMPLE | LEAK-AGE | COMPOSITION (Weight %) HCFC-22 | HFC-125 | Propane | VP (psia) | DP (%) |
|---|---|---|---|---|---|---|
| IQ | 0 | 49.95 | 49.95 | 0.1 | 184.5 | — |
| 1 | 10 | 42.7 | 57.1 | 0.2 | 184.0 | 0.3 |
| 2 | 20 | 43.5 | 56.3 | 0.2 | 183.4 | 0.6 |
| 3 | 30 | 44.5 | 55.3 | 0.2 | 182.7 | 1.0 |
| 4 | 40 | 45.7 | 54.1 | 0.2 | 181.9 | 1.4 |
| 5 | 50 | 47.2 | 52.7 | 0.1 | 181.0 | 1.9 |
| FQ | 50 | 56.0 | 43.9 | 0.1 | 181.0 | 1.9 |

TABLE XX

| SAMPLE | LEAKAGE | COMPOSITION (Weight %) | | | VP (psia) | DP (%) |
|---|---|---|---|---|---|---|
| | | HCFC-22 | HFC-125 | Propane | | |
| IQ | 0 | 1.0 | 98.9 | 0.1 | 199.9 | — |
| 1 | 10 | 1.0 | 98.8 | 0.2 | 199.8 | 0.1 |
| 2 | 20 | 1.0 | 98.8 | 0.2 | 199.7 | 0.1 |
| 3 | 30 | 1.0 | 98.9 | 0.1 | 199.6 | 0.2 |
| 4 | 40 | 1.0 | 98.9 | 0.1 | 199.5 | 0.2 |
| 5 | 50 | 1.0 | 98.9 | 0.1 | 199.4 | 0.3 |
| FQ | 50 | 1.0 | 98.9 | 0.1 | 199.4 | 0.3 |

EXAMPLE 10

Additional fluorocarbons, ethers, and hydrocarbons can be added to HCFC-22 and HFC-125 comprising effective amounts of ethane, butane, isobutane, dimethyl ether (DME), propylene, and difluoromethane (HFC-32) to make mixtures which are constant-boiling and could be useful as replacements for Refrigerant-502 and other medium-to-low-temperature refrigerants. This Example is not intended to identify all compositions of these constant-boiling mixtures, but rather to show that these mixtures are constant boiling.

A study shows that mixtures of HCFC-22 and HFC-125 with the following additional compounds in varing amounts in Table XXI form constant-boiling mixtures.

TABLE XXI

| Refrigerant/ Composition | Vapor Pressures | | |
|---|---|---|---|
| | 0% Evaporated psia | 50% Evaporated psia | % Change |
| HCFC-22/HFC-125/ Ethane (49/49/2) | 206.7 | 187.7 | 9.2 |
| HCFC-22/HFC-125/ Butane (49/49/2) | 181.8 | 177.1 | 2.6 |
| HCFC-22/HFC-125/ Isobutane (49/49/2) | 183.4 | 179.5 | 2.1 |
| HCFC-22/HFC-125/ DME (49/49/2) | 178.2 | 170.0 | 4.6 |
| HCFC-22/HFC-125/ Propylene (49/49/2) | 186.1 | 182.1 | 2.1 |
| HCFC-22/HFC-125/ HFC-32 (40/40/20) | 216.6 | 210.0 | 3.0 |

Additional components from Table I, II, or III could be added to form quaternary and greater mixtures. For example, a mixture of HCFC-22/HFC-125/HFC-32/HFC-134a and/or HFC-134 could be formed.

We claim:

1. A near-azeotropic composition consisting essentially of about 26.6 to 63.7 percent by weight chlorodifluoromethane, about 2 percent by weight propane, and about 33.6 to 70.6 percent by weight pentafluoroethane, wherein said composition has a vapor pressure of about 174.8 to 198.9 psia at room temperature and, wherein when 30 weight percent of the composition leaks out as vapor at room temperature, the vapor pressure of the composition changes less than 10 percent.

2. A process for producing refrigeration which comprises evaporating a near-azeotropic composition of claim 1 in the vicinity of a body to be cooled.

3. The near-azeotropie composition of claim 1 consisting essentially of about 60 percent by weight chlorodifluoromethane, about 2 percent by weight propane and about 38 percent by weight pentafluoroethane.

4. The near-azeotropic composition of claim 1 consisting essentially of about 38 percent by weight chlorodifluoromethane, about 2 percent by weight propane and about 60 percent by weight pentafluoroethane.

5. A process for producing refrigeration which comprises evaporating a near-azeotropic composition of claim 3 or 4 in the vicinity of a body to be cooled.

6. A near-azeotropic composition consisting essentially of
   (a) about 35 to 65 percent by weight chlorodifluoromethane, 34 to 64 percent by weight pentafluoroethane and about 1 to 5 percent by weight ethane, wherein said composition has a vapor pressure of about 206 psia at about 25° C.; or
   (b) about 35 to 65 percent by weight chlorodifluoromethane, 34 to 64 percent by weight pentafluoroethane and about 1 to 5 percent by weight butane or isobutane wherein said composition has a vapor pressure of about 182 psia at about 25° C.;
   wherein when 50 weight percent of said composition leaks out as vapor at room temperature, the vapor pressure of the composition changes less than 10 percent.

7. A process for producing refrigeration which comprises evaporating a near-azeotropic composition of claim 6 in the vicinity of a body to be cooled.

8. A near azeotropic composition of claim 6 consisting essentially of 49 percent by weight chlorodifluoromethane, 49 percent by weight pentafluoroethane and 2 percent by weight ethane.

9. A near azeotropic composition of claim 6 consisting essentially of 49 percent by weight chlorodifluoromethane, 49 percent by weight pentafluoroethane and 2 percent by weight butane or isobutane.

* * * * *